United States Patent Office 2,964,212
Patented Dec. 13, 1960

2,964,212
UTENSIL ADJUSTABLE COVER

Raynor Mead, 3059 Heath Ave., New York, N.Y.

Filed Nov. 2, 1956, Ser. No. 620,093

7 Claims. (Cl. 220—37)

This invention relates to improvements in culinary utensils.

An object of this invention is to provide an adjustable arrangement of parts for permanently connecting or removably connecting a cover to a culinary vessel so that the cover can be adjusted to various positions convenient to the user for various purposes and useful reasons.

Another object of this invention is to provide an arrangement of parts so the cover can be swung around, raised and lowered to various horizontal positions.

Another object of this invention is to provide an arrangement of parts so the cover can be raised and lowered to various set or locked positions.

Another object of this invention is to provide an arrangement of parts so the cover can be adjusted horizontally away from and close to the rim of a culinary vessel.

Another object is to provide the arrangement of parts so the cover can be raised up, swung back and down to the handle and raised up from the front of a vessel, and swung back with the rim of the cover swung over the back rim of the vessel and down to various set or locked positions.

Another object of this invention is to provide an extension cleat or arm to accommodate certain covers, such as dome type and certain other special type culinary covers.

Still another object is to provide a removable and adjustable connecting cleat-like element between the arrangement of parts and the cover with a space to accommodate the various type rims and covers.

Another specific object of this invention is to provide a handle having an adjustable arrangement and means for removably fixing it to a culinary vessel.

These and other objects, features and advantages of this invention will be manifest in the following detailed description and accompanying drawing of preferred embodiments thereof.

In the drawing wherein corresponding parts are indicated by the same reference numerals.

Figure 1:
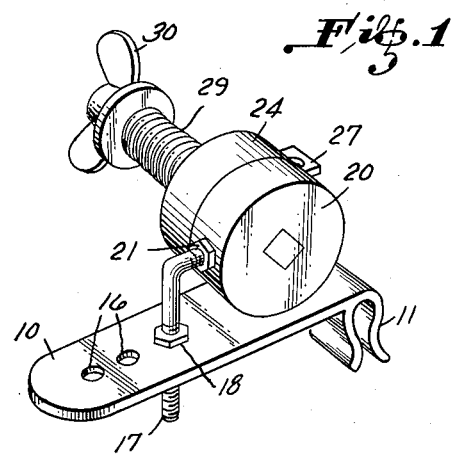
Figure 1 is an elevational side plan view of the arrangement of adjustable parts, with or without a handle.
Figure 2:
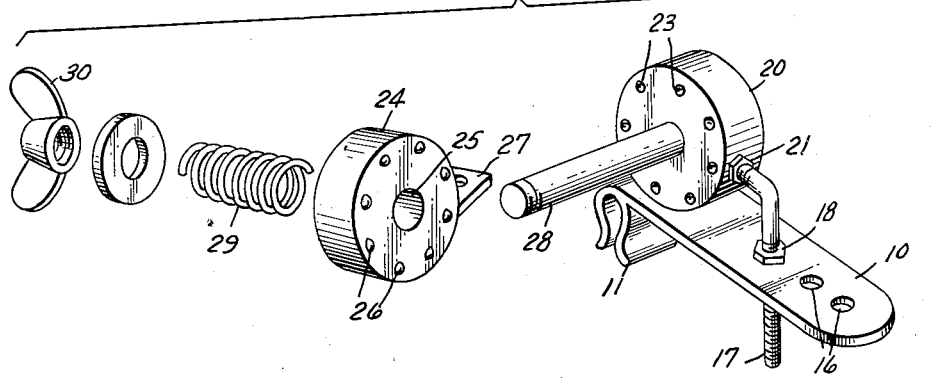
Figure 2 is an elevational side plan view of the inner surface of the disc-like elements showing the concave-like indentations and the convex-like protuberances, the bolt, spring and wing nut, and the post-like extension adjustable and removably connected in the adjustable and removable handle.
Figure 3:
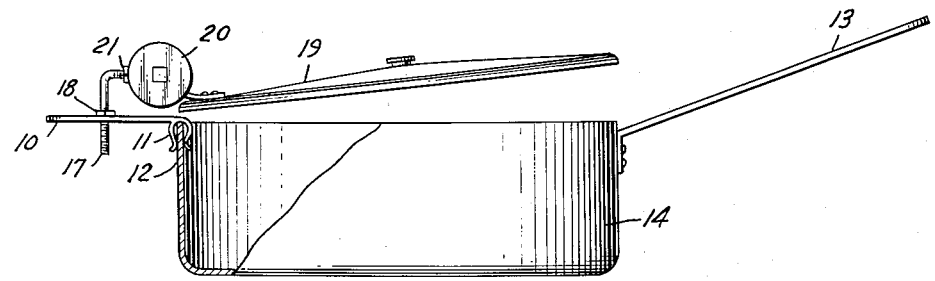
Figure 3 is an elevational side plan view of Figure 1, showing the handle removably clamped to a culinary vessel to support the vessel, and showing the post-like extension adjustably and removably connected in the handle and supporting the disc assembly and the cover.

Referring to the drawing, and in Figure 1, numeral 10 is a removable handle formed of any suitable shape or form and is integral with a clamp arrangement or a spring clam 11 or any suitable arrangement for permanently connecting or removably connecting to the side or rim 12 of the vessel 14 and handle 13 if desired, also the vessel handle 13 can be used to receive a post-like element 17 by forming a series of threaded apertures therein; handle 10 is formed with a series of threaded apertures 16 to accommodate the adjustable and removable threaded post-like element 17 which can have threaded adjusting nuts or set screws which can be used throughout the assembly. Nut 18 when unscrewed permits one to raise or lower post 17; post 17 can be removed to one of the other apertures 16 and can be adjusted up and down or away from or close to the element 11 or vessel 14. The upper end of post 17 can be straight, but as shown it is adjustably and removably engaged in a threaded aperture in a disc-like element 20, the threads can be a tight fit or other arrangements for the purpose intended, a threaded nut 21 can be used if desired.

The element 20 is formed with a central aperture surrounded with a series of concave-like indentations 23 on the inner surface, said element is adjustably and removably engaged with the disc-like element 24 which is formed with a central aperture 25 surrounded with a series of convex-like protuberances 26. Said element 24 is integral with an attaching element 27 if desired, or any other suitable adjustable arrangement for fixing or removably fixing to the rim on top central handle of the cover 19, or whatever arrangement may be necessary to accommodate certain covers such as dome shaped covers and various shaped rims. Element 27 can be riveted to a cover or extended like an arm for adjustably and removably connecting to the central top of the cover 19. Elements 20 and 24 are adjustably and removably held together with a bolt 28, spring 29 and wing nut 30, nut 30 can be adjusted so that the spring tension will permit the protuberances 26 to slide smoothly in and out of the indentations 23 at the desired set or locked positions for the cover 19. The handle 10 and the post 17 with disc assembly can be permanently fixed to a vessel 14 having no conventional handle or removably fixed in various ways and on both sides of the vessel to support a cover.

Having thus described various preferred embodiments of this invention, it is to be understood that the invention is not limited to those precise embodiments, since changes and modifications, obvious to one skilled in the art, may be effected therein without departing from the scope of the invention which is intended to be defined in the appended claims.

What I claim is:

1. A handle formed for removably connecting to a culinary vessel, said handle including a series of threaded apertures formed therein to accommodate a threaded post-like extension, the upper end of said threaded post-like extension accommodates a threaded aperture formed in a disc-like element, said extension having adjusting nuts or set screws, said disc-like element including a centrally formed aperture surrounded with a series of concave-like indentations for adjustably and removably engaging with a disc-like element formed with a central aperture surrounded with a series of convex-like proturerances, said disc-like elements adjustably and removably held together with a bolt, spring and wing nut, said disc-like element with the convex-like protuberances includes an attaching element arrangement removably connected to the rim of a culinary cover so that said cover can be raised and lowered to various horizontal positions, raised and lowered horizontally to various set or locked positions, raised and lowered horizontally and with either side rim of the cover slanting up or down in various positions, swung around horizontally and with either side rim of the cover slanting up or down in various positions, raised and lowered to various set or locked positions, adjusted horizontally away from or close to said vessel, raised up, back and down on said handle.

2. A handle formed integral with a culinary vessel, said handle having a series of threaded apertures formed therein to accommodate a threaded post-like extension, the upper end of said threaded extension accommodates a threaded aperture formed in a disc-like element, said extension having threaded adjusting nuts or set screws, said disc-like element including a centrally formed aperture surrounded with a series of concave-like indentations for adjustably and removably engaging with a disc-like element formed with a central aperture surrounded with a series of convex-like protuberances, said disc-like elements adjustably and removably held together with a bolt, spring and wing nut, said disc-like element with the convex-like protuberances includes an attaching element secured to the rim of a culinary cover, so that said cover can be raised and lowered to various horizontal positions, raised and lowered horizontally to various set or locked positions, raised and lowered horizontally and with either side rim of the cover slanting up or down in various positions, swung around horizontally and with either side rim of the cover slanting up or down in various positions, raised and lowered to various set or locked positions, adjusted horizontally away from and close to said vessel, raised up, back and down on said handle.

3. The combination of a culinary vessel having a cover, of a handle formed for removably connecting to said vessel, said handle including a series of threaded apertures formed therein to accommodate a threaded post-like extension having threaded adjusting nuts or set screws, the upper end of said threaded extension accommodates a threaded aperture formed in a disc-like element having a centrally formed aperture surrounded with a series of concave-like indentations for adjustably and removably engaging with a disc-like element formed with a central aperture surrounded with a series of convex-like protuberances, said disc-like elements adjustably and removably held together with a bolt, spring and wing nut, said disc-like element with the convex-like protuberances including an attaching element arrangement for removably connecting to the rim of a culinary cover so that said cover can be raised and lowered to various horizontal positions, raised and lowered horizontally to various set or locked positions, raised and lowered horizontally and with the side rim of the cover slanting up or down in various positions, swung around horizontally and with either side rim of the cover slanting up or down in various positions, raised and lowered to various set or locked positions, adjusted horizontally away from and close to said vessel, raised up, back and down on said handle.

4. The combination according to claim 3, including an extension arm formed at one end with a disc-like element having a central aperture surrounded with a series of convex-like protuberances for adjustably and removably engaging with the disc-like element having the central aperture surrounded with the concave indentations, this extension element having formed on its opposite end an attaching means for removably connecting to the knob-like handle on top of a culinary cover, so that said cover can be adjusted to the aforementioned positions in this arrangement for certain culinary covers.

5. The combination in a culinary vessel having a cover, of a handle integral with a culinary vessel, said handle formed with a series of threaded apertures for accommodating a threaded post-like extension having threaded adjusting nuts or set screws, the upper threaded end of said threaded extension accommodates a threaded aperture formed in a disc-like element having a centrally formed aperture surrounded with a series of concave-like indentations for adjustably and removably engaging with a disc-like element formed with a central aperture surrounded with a series of convex-like proturbances, said disc-like elements adjustably and removably held together with a bolt, spring and wing nut, said disc-like element with the convex-like protuberances including an attaching element secured to the rim of a culinary cover so that said cover can be raised and lowered to various horizontal positions, raised and lowered horizontally to various set or locked positions, raised and lowered horizontally and with either side rim of the cover slanting up or down in various positions, swung around horizontally and with either side rim of the cover slanting up or down in various positions, raised and lowered to various set or locked positions, adjusted horizontally away from and close to said vessel, raised up, back and down on said handle.

6. In combination with a culinary vessel having a cover, a horizontal handle formed with a series of threaded apertures, said handle integral with said vessel, a threaded post-like element having its lower threaded end adjustably and removably engaging with the threaded apertures in said handle, said threaded post-like element having threaded adjusting nuts or set screws, the upper threaded end of said threaded post-like element having a right angle-like bend is adjustably and removably engaged in a threaded aperture formed in a disc-like element having a central aperture surrounded with a series of concave-like indentations and is adjustably and removably engaged with a disc-like element formed with a central aperture surrounded with a series of convex-like protuberances, said disc-like elements adjustably and removably held together with a bolt, spring and wing nut, said disc-like element with the convex-like protuberances includes an attaching element for removably connecting to the rim of the culinary cover so that said cover can be raised and lowered to various horizontal positions, raised and lowered horizontally to various set or locked positions, raised and lowered horizontally and with either side rim of the cover slanting up or down in various positions, swung around horizontally and with either side rim of the cover slanting up or down in various positions, raised and lowered to various set or locked positions, adjusted horizontally away from and close to said vessel, raised up, back and down on said handle.

7. In combination with a culinary vessel, a handle formed with a series of threaded apertures, said handle formed for removably connecting to a culinary vessel, a threaded post-like element having threaded adjusting nuts or set screws, said post-like element adjustably and removably engaging with said handle and a disc-like element having a threaded aperture, said disc-like element including a centrally formed aperture surrounded with a series of concave-like indentations for adjustably and removably engaging with a disc-like element having a central aperture surrounded with a series of convex-like protuberances, said disc-like elements adjustably and removably held together with a bolt, spring and wing nut, said disc-like element with the convex-like protuberances includes an attaching element for removably connecting to the rim of a culinary cover so that said cover can be raised and lowered to various horizontal positions, raised and lowered horizontally to various set or locked positions, raised and lowered horizontally and with either side rim of the cover slanting up or down in various positions, swung around horizontally and with either side rim of the cover slanting up or down in various positions, raised and lowered to various set or locked positions, adjusted horizontally away from and close to said vessel, raised up, back and down on said handle.

References Cited in the file of this patent

UNITED STATES PATENTS

| 498,569 | Peterson | May 30, 1893 |
| 514,890 | Heilmann | Feb. 13, 1894 |
| 577,429 | Homan | Feb. 23, 1897 |
| 941,041 | Phillips | Nov. 23, 1909 |
| 1,395,554 | Brown | Nov. 1, 1921 |
| 2,181,799 | Carvalho | Nov. 28, 1939 |
| 2,428,839 | Salino | Oct. 14, 1947 |
| 2,568,637 | Jordim | Sept. 18, 1951 |
| 2,587,773 | Sell et al. | Mar. 4, 1952 |
| 2,694,538 | Consolo et al. | Nov. 16, 1954 |
| 2,751,901 | Livermore | June 26, 1956 |

FOREIGN PATENTS

| 206,357 | Great Britain | Nov. 8, 1932 |

UNITED STATES PATENT OFFICE
CERTIFICATION OF CORRECTION

Patent No. 2,964,212                            December 13, 1960

Raynor Mead

It is hereby certified that error appears in the above numbered patent requiring correction and that the said Letters Patent should read as corrected below.

Column 2, line 19, for "on" read -- or --.

Signed and sealed this 13th day of June 1961.

(SEAL)
Attest:

ERNEST W. SWIDER                                    DAVID L. LADD
Attesting Officer                                            Commissioner of Patents